United States Patent
Park

(10) Patent No.: US 7,601,470 B2
(45) Date of Patent: Oct. 13, 2009

(54) COLOR FILTER SUBSTRATE INCLUDING PROCESSING KEY AND METHOD FOR FABRICATING THE SUBSTRATE

(75) Inventor: Jae-Seok Park, Gyungsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 738 days.

(21) Appl. No.: 10/968,384

(22) Filed: Oct. 20, 2004

(65) Prior Publication Data

US 2005/0106477 A1   May 19, 2005

(30) Foreign Application Priority Data

Nov. 18, 2003  (KR) .................. 10-2003-0081693

(51) Int. Cl.
*G02B 5/20* (2006.01)
(52) U.S. Cl. ........................................... 430/7
(58) Field of Classification Search ............ None
See application file for complete search history.

(56) References Cited

U.S. PATENT DOCUMENTS

| | | | |
|---|---|---|---|
| 5,712,065 A | | 1/1998 | Chiang |
| 5,925,484 A | | 7/1999 | Shima et al. |
| 6,136,481 A | * | 10/2000 | Aoki ............................... 430/7 |
| 6,143,450 A | * | 11/2000 | Sobue et al. ..................... 430/7 |
| 6,147,729 A | | 11/2000 | Kurauchi et al. |
| 6,323,921 B1 | | 11/2001 | Kurauchi et al. |
| 6,392,735 B1 | | 5/2002 | Tani |
| 6,577,374 B1 | | 6/2003 | Nakata et al. |
| 7,277,142 B2 | * | 10/2007 | Lee et al. ..................... 349/106 |
| 2001/0007733 A1 | | 7/2001 | Matsuyama et al. |

FOREIGN PATENT DOCUMENTS

| | | | |
|---|---|---|---|
| JP | 7-049415 A | * | 2/1995 |
| JP | 7-181316 | | 7/1995 |
| JP | 7-95021 | | 4/1996 |
| JP | 9-197120 | | 7/1997 |
| JP | 9-230124 | | 9/1997 |
| JP | 10-160927 | | 6/1998 |
| JP | 10-197713 | | 7/1998 |
| JP | 10-221696 | | 8/1998 |
| JP | 10-239513 | | 9/1998 |
| JP | 11-212076 | | 8/1999 |
| JP | 2000-29206 | | 1/2000 |
| JP | 2000-75305 | | 3/2000 |
| JP | 2001-108815 | | 4/2001 |
| JP | 2002-131902 | | 5/2002 |
| JP | 2002-236210 | | 8/2002 |
| JP | 2003-15294 | | 1/2003 |
| JP | 2003-140121 A | * | 5/2003 |
| JP | 2003-177228 | | 6/2003 |
| JP | 2002-055223 A | * | 2/2007 |
| KR | 2003-3058213 A | * | 7/2003 |

* cited by examiner

*Primary Examiner*—John A. McPherson
(74) *Attorney, Agent, or Firm*—McKenna Long & Aldridge LLP

(57) ABSTRACT

A method for fabricating a color filter substrate of a liquid crystal display panel includes forming color filter layers and a process key pattern on a substrate, forming a black matrix to separate the color filter layers from one another, and forming an alignment layer on the substrate.

4 Claims, 6 Drawing Sheets

COLOR FILTER SUBSTRATE INCLUDING PROCESSING KEY AND METHOD FOR FABRICATING THE SUBSTRATE

This application claims the benefit of the Korean Application No. P2003-81693 filed on Nov. 18, 2003, which are hereby incorporated by reference.

BACKGROUND OF THE INVENTION

1. Field of the Invention

The present invention relates to a method for fabricating a color filter substrate of a liquid crystal display (LCD) panel, and more particularly, to a method for fabricating a color filter substrate including a process key.

2. Description of the Related Art

An LCD panel mainly includes an upper substrate and a lower substrate, and utilizes a liquid crystal driven by an applied signal to display an image. In general, the upper substrate is regarded as a color filter substrate for displaying an image in color, and the lower substrate is regarded as a thin film transistor array substrate on which unit pixels are arranged in a matrix configuration. Each of the unit pixels is provided with a thin film transistor (hereinafter, referred to as TFT) as a switching device.

Next, the structure of an LCD panel including an upper substrate 150 and a lower substrate 100 will be described with reference to FIG. 1. As shown in FIG. 1, a plurality of gate lines 101 are arranged parallel to one another on the lower substrate 100, and a plurality of data lines 102 are arranged parallel to one another and perpendicular to the gate lines 101. Unit pixel regions are defined by intersection of the gate lines 101 and the data lines 102, and are arranged in a matrix configuration on the lower substrate 100. Also, a switching device TFT 103 for driving the unit pixel is formed at each intersection of the gate and data lines 101 and 102. The TFT 103 includes a gate electrode, source and drain electrodes and a channel layer. The gate electrodes are connected to the gate lines 101. The source and drain electrodes are connected to the data lines 102.

In addition, pixel electrodes 104 for supplying an electric field to a liquid crystal 110 are formed on the lower substrate 100. An alignment layer (not shown) for aligning the liquid crystal 110 is formed on the pixel electrodes 104 over the entire lower substrate 100. The alignment layer is formed of an organic material such as polyimide by a rubbing process such that the alignment layer is rubbed with a rubbing cloth or the like after having been applied. Moreover, spacers (not shown) for maintaining a uniform cell-gap between the lower substrate 100 and the upper substrate 150 are distributed at regular intervals. A sealant (not shown) is formed along an outer edge of a pixel region of the lower substrate 100 to prevent leakage of an injected liquid crystal 110 and to bond the upper substrate 150 and the lower substrate 100.

Next, a process for fabricating an LCD panel having such a structure will now be described with reference to FIG. 2. The LCD panel includes a TFT array substrate on which TFTs are arranged in a matrix configuration and a color filter substrate for displaying color information. The process for fabricating the LCD panel includes a step for forming the TFT array substrate, a step for forming the color filter substrate, which is a separate step from the step of forming the TFT array substrate, and a cell step for forming a unit LCD panel by attaching the TFT array substrate and the color filter substrate.

The step for forming the TFT array substrate includes forming a TFT, and forming an alignment layer for aligning a liquid crystal on a substrate. The forming of the TFT further includes forming gate electrodes and gate lines, a gate insulation film, a semiconductor layer, source and drain electrodes and data lines, and a pixel electrode on the substrate. The forming of the alignment layer further includes forming an organic layer such as a polyimide layer and a rubbing process for rubbing the alignment layer with a rubbing cloth or the like. After forming the TFT and before forming the alignment layer, a process may be added for forming spacers maintaining a cell-gap between the TFT array substrate and the color filter substrate.

The process for forming the color filter substrate includes a step for forming a color filter layer, a step for forming an alignment layer, and a step for forming a seal pattern. The step for forming the color filter layer includes forming a black matrix, an overcoat layer and a common electrode. Then, the step for forming the alignment layer is performed thereon. The step for forming the alignment layer includes applying an alignment layer such as polyimide and rubbing the alignment layer with a rubbing cloth or the like. After forming the common electrode and before forming the alignment layer, a process may be added for forming spacers. Here, since the spacers maintain a cell-gap between the TFT array substrate and the color filter substrate, the spacers may be formed on either of the TFT array substrate or the color filter substrate.

After the step of forming the alignment layer, a seal pattern is formed along an outer edge of a pixel region of the color filter substrate to maintain a liquid crystal injected as well as the cell-gap. Alternatively, the seal pattern may be formed on the TFT array substrate according to circumstances.

Next, the cell step is performed to fabricate a unit LCD panel by attaching the TFT array substrate and the color filter substrate which have been fabricated through separate processes. The cell step includes an attachment, a cut, and a liquid crystal injection. The attachment is performed such that the TFT array substrate and the color filter substrate face each other and are attached together. The attached upper and lower substrates are coupled by the sealant, and the cell-gap is maintained. Here, when the TFT array substrate and the color filter substrate are arranged to face each other, a high precision is required. In addition, a black matrix is formed on the color filter substrate to cut off unnecessary light irradiated from the TFT array substrate. However, the unnecessary light may be leaked even by a minute misalignment. Therefore, to prevent a misalignment of the upper substrate and the lower substrate, alignment keys are formed at the upper substrate and the lower substrate. By detecting the alignment keys during the attachment process, a precise alignment of the substrates is performed.

The alignment key is needed not only in a process for attaching the upper substrate and the lower substrate but also in other processes for forming the upper substrate or the lower substrate to precisely align the substrate on a stage to perform each process. Particularly, the alignment key used to arrange the substrate in each process is called a process key, and a plurality of process keys are formed on an outer edge of the pixel region.

Next, a process for fabricating a color filter substrate with the process key will be described with reference to FIGS. 3 and 4.

After the attachment of the lower and upper substrates, a cut process is performed to divide the attached substrates by the unit cell. Since a plurality of unit LCD panel regions are simultaneously formed on a large-sized mother substrate to improve productivity, the mother substrate is cut into a plurality of the unit LCD panels. After the cut process, the liquid crystal is injected into each unit LCD panel, and then a liquid crystal injection hole is sealed, thereby completing fabrication of the LCD panel. As mentioned above, to fabricate a high quality LCD panel, the color filter substrate and the TFT array substrate should be precisely aligned with a difference range of less than a few micrometers.

Next, a process for fabricating the color filter substrate having various process keys will now be described with reference to FIG. 3 and FIGS. 4A to 4C. FIG. 3 is a plan view showing that a color filter layer and a process key are formed on a substrate 301. A process key 310 for precisely aligning the substrate 301 in various processes is formed at an outer edge of a pixel region. By recognizing the process key 310 with a camera or the like mounted at each stage where a process is performed, it is determined whether the substrate 301 is arranged well or not.

FIGS. 4A to 4C are views taken along line I-I' of FIG. 3 to show a sequential process for fabricating the color filter substrate including the process key according to the related art. As shown in FIG. 4A, a black matrix pattern 302 is formed on the substrate 301. The process key 310 embossed on an outer edge of a pixel region is made of a material for the black matrix 302, which may be formed of a metallic or resin material. The black matrix 302 made of resin is mainly used to fabricate a large-sized LCD device.

In a process for forming the black matrix 302 on the substrate 301, a photosensitive resin for the black matrix 302 is deposited on the substrate 301, and then an exposure using a mask having a certain pattern, a development and a cleaning are performed, thereby forming the black matrix pattern 302. Therefore, a mask process is needed for forming the black matrix pattern 302.

Next, as shown in FIG. 4B, after the black matrix pattern 302 is formed, red, blue and green (R, G and B) color filter layers 303a, 303b and 303c are formed on the substrate 301. The color filter layers 303a, 303b and 303c may be formed by a method such as a printing method, an electrodepositing method, a dyeing method, a pigment dispersing method or the like. In the pigment dispersing method, one of R, G and B photoresist color filter layers 303a, 303b and 303c is formed on the substrate 301 on which the black matrix 302 has been formed, and then an exposure process using a mask, a development and a cleaning process are performed thereon, thereby forming a color filter layer at a predetermined pixel region. To form the color filter layers of various colors, each of R, G, B color filter layers 303a, 303b and 303c passes through the mask process.

Next, in FIG. 4C, an overcoat layer 304 of an organic material for compensating a step difference between the color filter layers 303a, 303b and 303c is formed. The overcoat layer 304 is unnecessary when the step difference between the color filter layers 303a, 303b and 303c does not exist, but the overcoat layer 304 is commonly formed when the resin black matrix 302 is used. After the overcoat layer 304 has been formed, a common electrode 305 for supplying an electric field to a liquid crystal is formed. The common electrode 305 may be formed of an ITO (indium tin oxide), a transparent electrode. After the formation of the common electrode 305, spacers 306 for maintaining a cell-gap between the lower substrate and the upper substrate are formed. The spacer 306 may be formed by various methods such as a scattering method, a nonelectrostatic scattering method, and a patterning method or the like. After the formation of the spacer 306, a process for forming an alignment layer 307 for aligning the liquid crystal is performed. After that, a sealant may be formed along an outer edge of a pixel region to prevent leakage of the liquid crystal injected and maintain the cell-gap between the attached substrates. The color filter substrate is thus completed.

In the process for forming the color filter substrate, the substrate 301 is required to be precisely arranged. For example, the substrate 301 and the mask should be precisely arranged to perform a predetermined mask process. To this end, an image of a process key is detected by a camera or the like which is mounted at a predetermined position, and then it is determined whether the substrate 301 is arranged well or not by comparing the detected information with a predetermined data. More importantly, high precision with a difference range of less than a few micrometers (μm) is required when the upper substrate and the lower substrate are attached.

However, in the related art, a separate mask is applied when the process for forming the black matrix 302 is performed, which delays a process performance. Also, because the mask process is followed by an exposure, a development, and a cleaning process, a lot of equipment are needed to perform such processes, thereby causing a delay in the whole fabrication process and deterioration of the LCD panel.

SUMMARY OF THE INVENTION

Accordingly, the present invention is directed to a liquid crystal display (LCD) panel having a color filter substrate including a process key and a method for fabricating the substrate that substantially obviates one or more of the problems due to limitations and disadvantages of the related art.

An object of the present invention is to provide an LCD panel having a color filter substrate including a process key and a method for fabricating the substrate that improve a yield and reduce costs for fabrication by using a small number of masks.

Another object of the present invention is to provide an LCD panel having a color filter substrate including a process key and a method for fabricating the substrate in which the substrate can be aligned with high precision.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, there is provided a method for fabricating a color filter substrate of an LCD panel comprises forming color filter layers and a process key pattern on a substrate, forming a black matrix to separate the color filter layers from one another, and forming an alignment layer on the substrate.

In another aspect, a color filter substrate of an LCD panel comprises a substrate, sub-color filter layers and a process key pattern on the substrate, a black matrix disposed between the sub-color filter layers separating the sub-color filter layers from one another, and an alignment layer on the sub-color filter layers and the black matrix.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
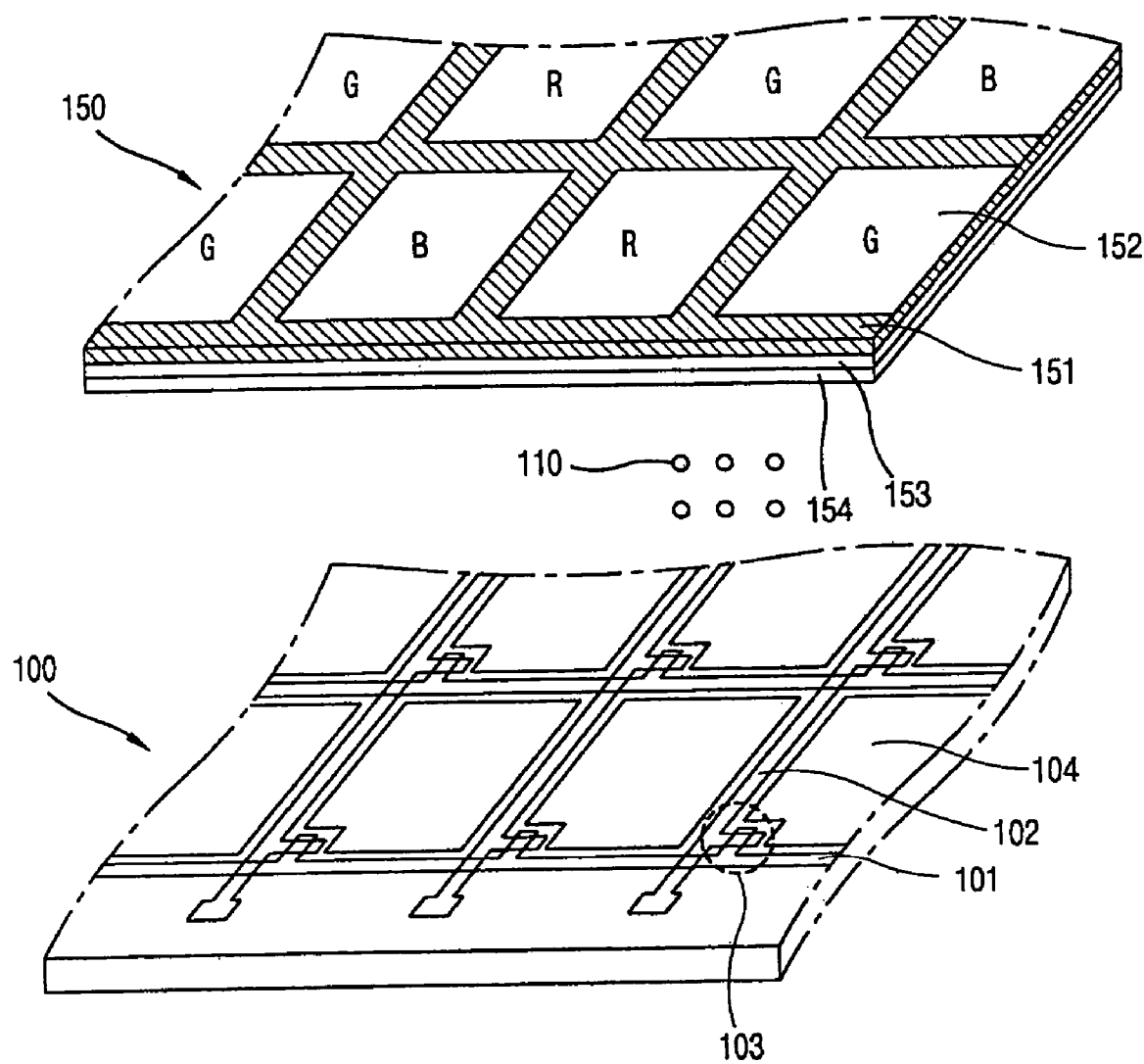
FIG. 1 is a perspective view of an LCD device according to the related art.
Figure 2:
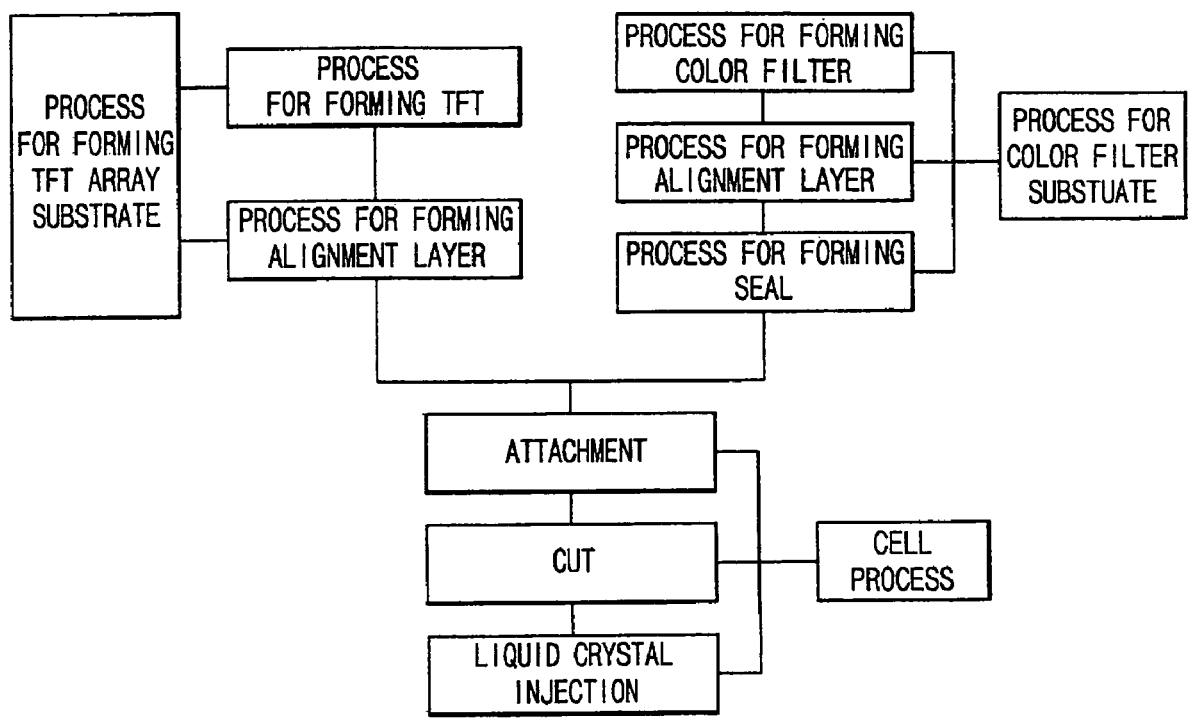
FIG. 2 is a schematic flow chart of a fabrication process of the LCD device of FIG. 1.
Figure 3:
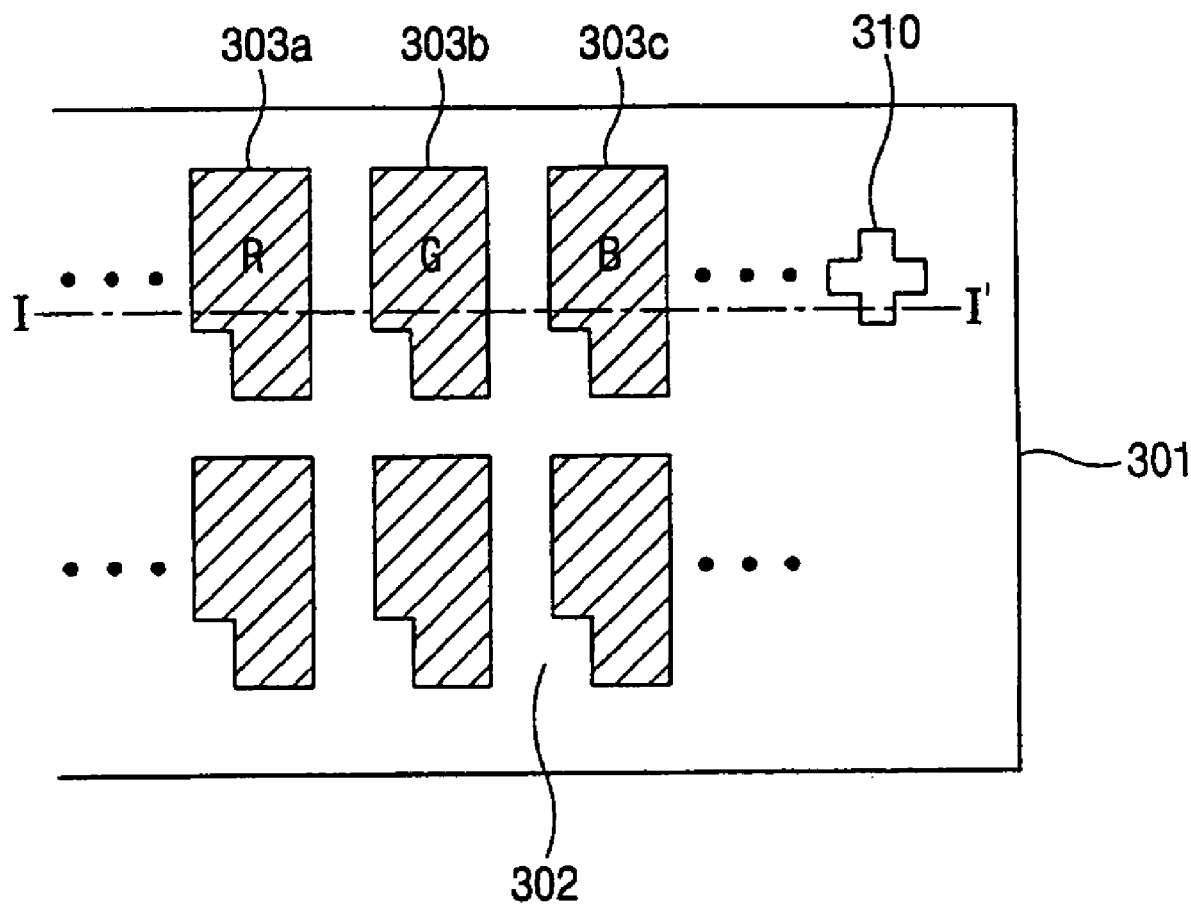
FIG. 3 is a plan view of a color filter substrate having a process key according to the related art.
Figure 4A:
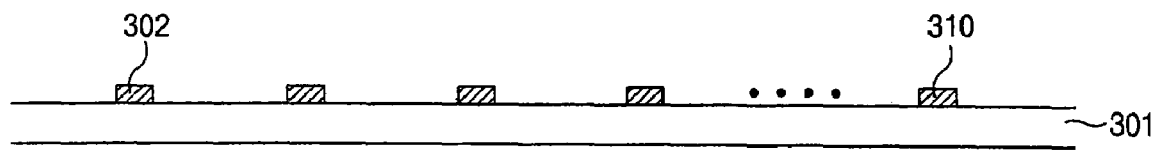
FIGS. 4A to 4C show a sequential process for fabricating the color filter substrate of the FIG. 3.
Figure 4B:
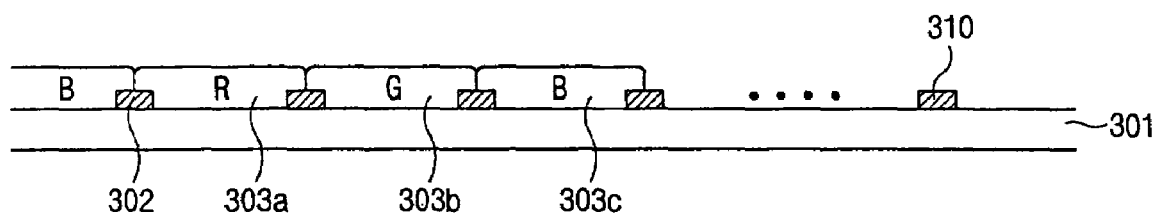
Figure 4C:
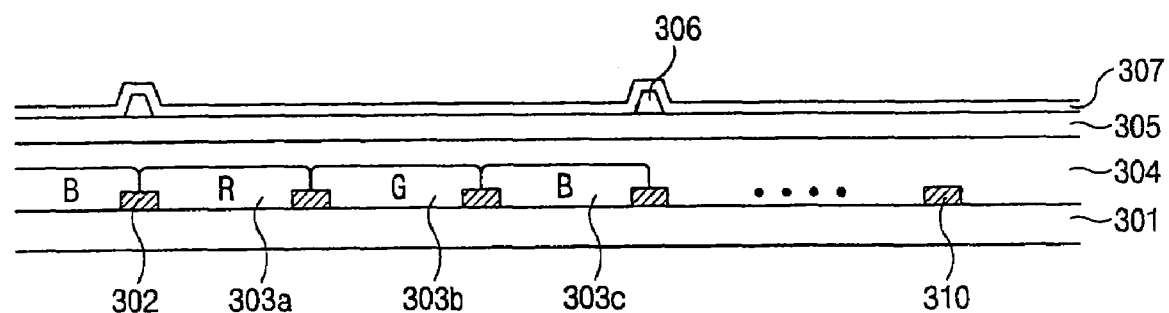
Figure 5:
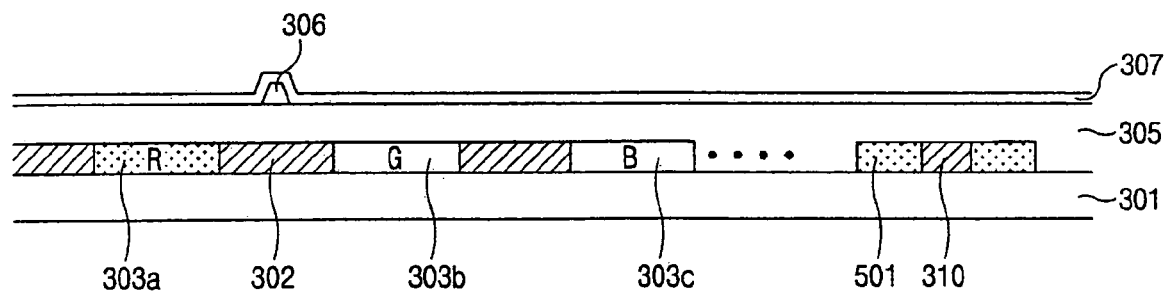
FIG. 5 is a sectional view of a color filter substrate according to a first exemplary embodiment of the present invention.

A first embodiment of the present invention will now be described with reference to FIG. 5. As shown in FIG. 5, a color filter layer of this embodiment includes R, G and B sub-color filter layers 303a, 303b and 303c that are arranged on a transparent color filter substrate 301 in a matrix configuration at regular intervals. The color filter layer is formed in an island shape that the sub-color filter layers 303a, 303b and 303c are separated from one another. In addition, a process key 310 for identifying whether the color filter substrate 301 is arranged well is formed on an edge of the color filter substrate 301.

The process key 310 is formed in a recessed region 310a (of FIG. 6A), which is regarded as a process key region at a process key pattern 501. The process key pattern 501 is formed of a material same as that for the R, G or B sub-color filter layers 303a, 303b and 303c and a black matrix material is injected into the process key region 310a. A plurality of process keys 310 may be formed at predetermined positions of the edge of the color filter substrate 301. In addition, a black matrix 302 is formed between the sub-color filter layers 303a, 303b and 303c so as to cut off light undesirably leaking thereupon from a lower substrate.

A common electrode 305, a transparent electrode, for applying an electric field to a liquid crystal is formed on the color filter substrate 301 on which the black matrix 302 and the color filter layer 303 have been formed. The common electrode 305 may be formed of ITO (indium Tin Oxide) or IZO (Indium Zinc Oxide). When an LCD panel is driven as an IPS mode in which the common electrode 305 is formed on a TFT array substrate, the common electrode 305 may not be formed on the color filter substrate 301. However, to prevent electrostatic discharge, an ITO layer may be formed at a back surface or an inner surface of the color filter substrate 301. Then, the process for forming the color filter layer may be performed.

Next, spacers 306 of (FIG. 6C) for maintaining a cell-gap between the upper substrate and the lower substrate are formed on the color filter substrate 301 on which the common electrode 305 has been formed. The spacer 306 may be a ball spacer formed by a dispersing method or a column spacer formed through a patterning method. If the spacer 306 is a column spacer, the spacer 306 may be formed at a predetermined position. In the exemplary embodiment of the present embodiment, the column spacer 306 is formed on the black matrix 302 to improve an aperture ratio of the LCD panel. Also, an alignment layer 307 is formed on the color filter substrate 301 on which the spacers 306 have been formed. The alignment layer 307 is an organic layer such as a polyimide or the like, and is formed on the color filter substrate 301 by being rubbed in a certain direction.

A process for fabricating the color filter substrate 301 having such a structure will now be described in detail with reference FIGS. 6A to 6C. The color filter layer may be fabricated through various methods such as a printing method, an electrodepositing method, a pigment dispersing method or the like. In this exemplary embodiment, the pigment dispersing method, in which a sub-filter layer may be precisely formed, is employed as described below.

Figure 6A:
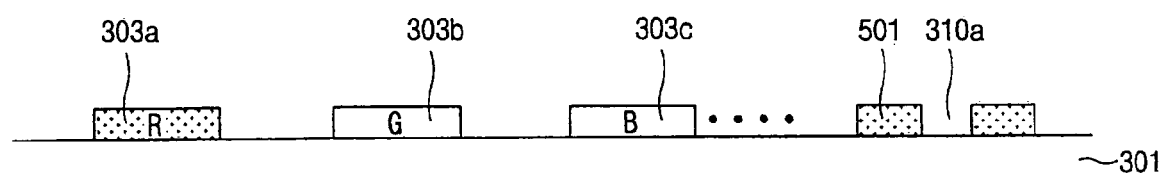
FIGS. 6A to 6C show a sequential process for fabricating a color filter substrate including a process key according to the first embodiment of the present invention.
Figure 6B:
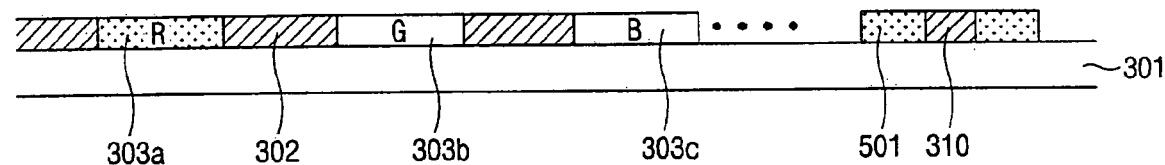

First, as shown in FIG. 6A, one of R, G and B sub-color filter layers 303a, 303b and 303c is applied onto the transparent color filter substrate 301. The R, G and B sub-color filter layers 303a, 303b and 303c may be formed in random order. Here, it will be described that the sub-color filter layers 303a, 303b and 303c are formed in order of R, G and B in this exemplary embodiment.

After the R sub-color filter layer 303a is formed on the color filter substrate 301, the photosensitive R sub-color filter layer 303a is exposed using a mask (not shown). Here, a negative type photosensitive organic layer that is hardened when exposed to light is utilized as the photosensitive red sub-color filter 303a. Herein, the mask (not shown) also includes a pattern for a process key to form the process key 310 on an outer edge of the color filter substrate 301. The red sub-color filter layer 303a includes a process key pattern 501 formed of a red color filter, and the process key pattern 501 includes the recessed portion 310a. A black matrix material is injected into the recessed portion 310a of the process key pattern 501, thereby forming the process key 310. A plurality of process keys 310 may be formed, and each of the process keys 310 works as an alignment key for a precise alignment of the substrate 301.

After the formation of the red sub-color filter layer 303a, the green sub-color filter layer 303b is formed on the entire surface of the color filter substrate 301. A negative type photosensitive organic layer may be also utilized as the green sub-color filter layer 303b. An exposure is performed on the organic layer for the green sub-color filter layer 303b using a mask without the process key pattern 501. Since the mask utilized to form the red sub-color filter layer 303a and the mask utilized to form the green sub-color filter layer 303b are the same except for the process key pattern 501, the mask for the red sub-color filter layer 303a may be used to form the green sub-color filter layer 303b if its process key pattern 501 is removed.

The same mask may be utilized because the red and green sub-color filter layers 303a and 303b and a blue sub-color filter layer 303c to be formed thereafter all have the same pattern. Thus, if one mask is moved at a predetermined distance to be utilized when the exposure is performed, a mask process may be performed without replacing the mask with a new one.

Next, the blue sub-color filter layer 303c is formed in the same manner. As a result of those processes, the R, G and B sub-color filter layers 303a, 303b and 303c are formed at regular intervals. Although the process key 310 is formed in the step of forming the red sub-color filter layer 303a in the first embodiment, the process key 310 may be formed in any of steps of forming the R, G and B sub-color filter layers 303a, 303b and 303c, and the order of forming the sub-color filter layers 303a, 303b and 303c may be set randomly.

The color filter layer may be formed of hydrophobic resin or the like so that the black matrix 302, an organic layer having fluidity, is not absorbed to the color filter layer. To form the color filter layer having a hydrophobic property, a polymer material may be added into the color filter layer to function as a physical bridge by hydrophobic interaction with an organic component of the color filter layer. The color filter layer may include a material selected from the group consisting of polypropylene oxide, polybutylene oxide, polytetramethylene oxide, and fatty polyester, wherein the fatty polyester includes polylactide, polyglycollide, lactide-glycollide copolymer, polybutylade or the like. These polymers are bonded to hydroxy (OH group) in the color filter layer, so that a bonding group of the color filter component, which can be bonded to other materials, may be removed. Therefore, the color filter layer without the bonding group have a hydrophobic property. Although the black matrix 302 having fluidity is formed on the color filter layer, the black matrix 302 is not absorbed to the color filter layer thus to flow and be removed.

After the formation of the hydrophobic color filter layer, the entire surface of the color filter substrate 301 is formed with an opaque black matrix material having fluidity. Even though the entire surface of the color filter substrate 301 is formed with the black matrix 302, the black matrix 302 is not formed on the hydrophobic color filter layer but flows down. Accordingly, as shown in FIG. 6B, the black matrix 302 is formed only at a valley between the sub-color filter layers 303a, 303b and 303c.

Next, the black matrix 302 formed between the sub-color filters layers 303a, 303b and 303c is heated, thereby removing a solvent included in the black matrix 302, and then is hardened. As a hardening method, a thermosetting method that the color filter substrate 301 on which the black matrix 302 has been formed is heated in a high temperature in a chamber.

After the formation of the color filter layer with the hydrophobic property and the black matrix 302, a separate mask process for forming the black matrix 302 may not be need. Since the mask process can be omitted, the number of expensive masks that are used to fabricate the color filter substrate 301 may be reduced, and the number of processes, such as exposure, development, and cleaning, which are followed by the use of the mask, can also be reduced. In addition, the black matrix 302 is not formed on the hydrophobic color filter layer and its volume is reduced as the black matrix 302 is harden by heating, thereby skipping the process for forming an overcoat layer. Since the mask process is not performed for forming the black matrix 302, a process key is not formed in such a process. Therefore, in the present embodiment, the process key 310 is formed with the color filter layer in the process for forming the color filter layer.

Figure 6C:
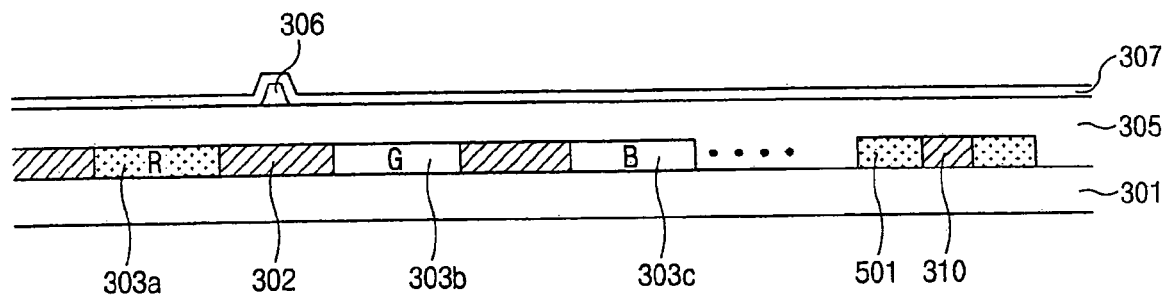

Next, as shown in FIG. 6C, a common electrode 305 for applying an electric field to a liquid crystal is formed on the color filter substrate 301 on which the color filter layer, the black matrix 302 and the process key 310 have been formed. The common electrode 305 is formed on the color filter substrate 301 in an TN (twisted nematic) mode. However, because the common electrode 305 is formed on a TFT array substrate in an IPS (in-plane switching) mode, such a process for forming the common electrode 305 on the color filter substrate 301 may be unnecessary.

After the formation of the common electrode 305, a photosensitive organic layer is deposited for forming the spacers 306 on the common electrode 305. A mask for the spacer 306 is applied on the photosensitive organic layer, and an exposure, a development and a cleaning process are performed, thereby forming the spacer patterns 306. The spacers 306 maintain a cell-gap between a lower substrate and an upper substrate, and prevent gravity deterioration that the liquid crystal is gathered to the direction of gravity.

After the formation of the spacers 306, an alignment layer 307 for aligning the liquid crystal is formed on the color filter substrate 301. The process for forming the alignment layer 307 includes a rubbing process in which the alignment layer is rubbed with a rubbing cloth or the like in a certain direction. After the formation of the alignment layer, the color filter substrate 301 is thus completed.

Next, a color filter substrate and its fabrication process according to a second embodiment of the present invention will now be described with reference to FIGS. 7 to 8C.

Figure 7:
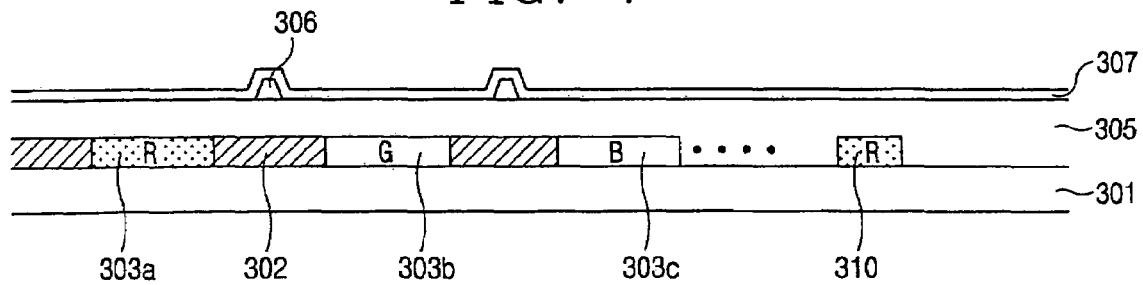
FIG. 7 is a sectional view of a color filter substrate according to a second exemplary embodiment of the present invention.

Unlike the process key 310 of the color filter substrate 301 described in FIG. 5, the process key 310 shown in FIG. 7 is embossed on the color filter substrate 301. That is, in FIG. 5, the process key 310 is formed at the recessed portion 310a of the process key pattern 501, but the process key 310 according to the second embodiment of the present invention, shown in FIG. 7 is embossed by patterning the color filter layer.

As shown in FIG. 7, the R, G and B sub-color filter layers 303a, 303b, and 303c are formed on the color filter substrate 301, and the process key 310 is formed on an edge of the color filter substrate 301 by patterning one of the R, G and B sub-color filter layers 303a, 303b and 303c. The process key 310 is embossed on the substrate 301. In FIG. 7, the process key 310 may be formed by the same material as that for the R sub-color filter 303a. But other material such as G sub-color filter, B sub-color filter or the like may also be utilized to form the process key 310. Except for the structure of the color filter layer and the process key 310, the second embodiment is the same as the first embodiment of the present invention.

Next, a process for fabricating a color filter substrate according to the second embodiment of the present invention will now be described with reference to FIGS. 8A to 8C.

Figure 8A:
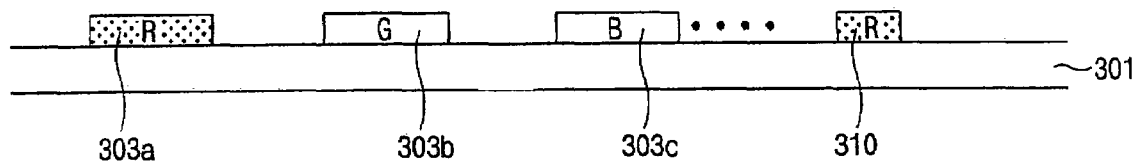
FIGS. 8A to 8C show a sequential process for fabricating a color filter substrate including a process key according to the second embodiment of the present invention.
Figure 8B:
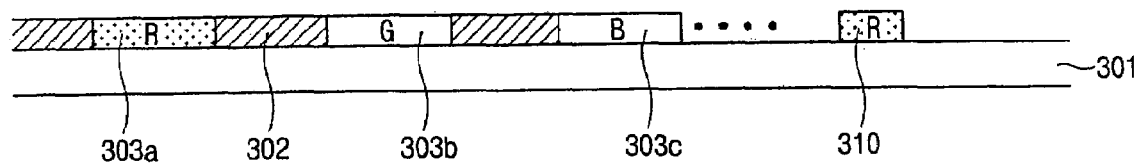
Figure 8C:
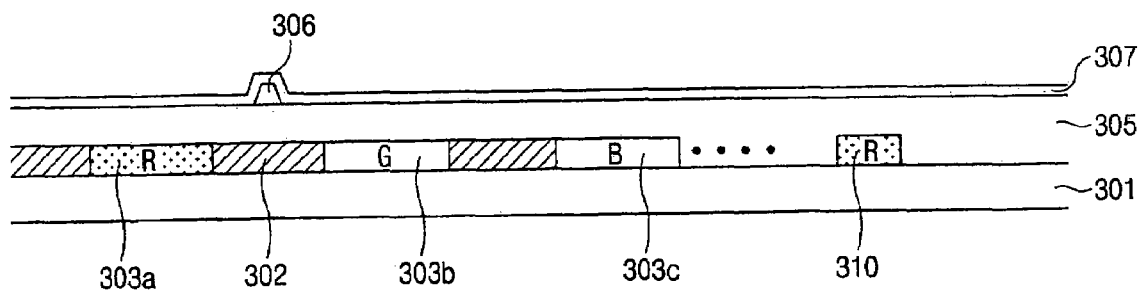

The fabrication process of the color filter layer 301 described in FIG. 8A to 8C is different from that of the first embodiment in only that the process key 310 is embossed in a process for forming a sub-color filter layer on the substrate. That is, as shown in FIG. 8A, the embossed process key 310 is formed with the R sub-color filter layer 303a in a process for forming the R sub-color filter layer 303a by a pigment dispersing method. Then, the G and B sub-color filter layers 303b and 303c are formed. The process key 310 may be formed of the same resin material as that for the R, G or B sub-color filter layers 303a, 303b and 303c. As described in the first embodiment, the color filter layer has the hydrophobic property.

Next, as shown in FIG. 8B, the black matrix 302 having fluidity is formed on the color filter substrate 301. The black matrix 302 is not formed on the color filter layer due to the hydrophobic property of the color filter layer but formed only at a valley between the sub-color filter layers 303a, 303b and 303c. A process for hardening the black matrix 302 is the same as that of the first embodiment.

Then, as shown in FIG. 8C, the common electrode 305, the spacers 306 and the alignment layer 307 are formed on the black matrix 302 and the color filter layer including the R, G and B sub-color filter layers 303a, 303b and 303c, thereby completing the color filter substrate.

In the present embodiment, the process for forming the process key 310 is described when an LCD panel is operated in a TN mode. But a fabrication process of the LCD panel according to the present embodiment may be applied not only to the TN mode but also to the IPS mode. Since a common electrode applying an electric field to a liquid crystal is not formed on a color filter layer in an IPS LCD device, when the color filter substrate of the IPS mode LCD is formed, the process for forming the common electrode in the present embodiment is not performed. However, in the IPS mode, to prevent electrostatic discharge, a process is added for forming an ITO layer at a back surface of the substrate or inner surface of the color filter.

As described above, by forming a hydrophobic color filter layer, a mask used to form a black matrix may not be required. In addition, because a process key may be formed in a process for forming a color filter layer, a separate process for forming the process key may be omitted. In addition, by reducing the number of masks, a process for forming the color filter substrate may be simplified.

It will be apparent to those skilled in the art that various modifications and variations can be made in the color filter substrate including a process key and method of fabricating the substrate of the present invention without departing from the spirit or scope of the invention. Thus, it is intended that the present invention cover the modifications and variations of this invention provided they come within the scope of the appended claims and their equivalents.

What is claimed is:

1. A color filter substrate of a liquid crystal display panel, comprising:
   a substrate;
   sub-color filters on the substrate;
   a process key pattern on an edge of the substrate, wherein the process key pattern is provided with a process key region having a recessed portion,
   and the process key pattern is formed of the same layer as one of the sub-color filter layers;
   a black matrix disposed between the color filter layers separating the sub-color filter layers from one another; and
   a process key formed in the recessed portion of the process key pattern and filled in the recessed portion of the process key pattern, wherein the process key is formed by a material forming the black matrix.

2. The substrate of claim 1, wherein the sub-color filter layers are formed of a hydrophobic material.

3. The substrate of claim 1, wherein the sub-color filter layers include at least one of polypropylene oxide, polybutylene oxide, polytetramethylene oxide and fatty polyester.

4. A color filter substrate of a liquid crystal display panel, comprising:
   a substrate;
   hydrophobic sub-color filter layers on the substrates;
   a process key pattern on an edge of the substrate, wherein the process key pattern is provided with a process key region having a recessed portion, and the process key pattern is formed of the same layer as one of the hydrophobic sub-color filter layers;
   a black matrix disposed between the hydrophobic sub-color filter layers separating the hydrophobic sub-color filter layers from one another;
   a process key formed in the recessed portion of the process key pattern and filled in the recessed portion of the process key pattern, wherein the process key is formed of a same material forming the black matrix;
   an overcoat layer on the hydrophobic sub-color filter layers, the black matrix and the process key;
   a common electrode on the overcoat layer;
   spacers on the common electrode; and
   an alignment layer on the spacers and the common electrode.

* * * * *